Figure 1:
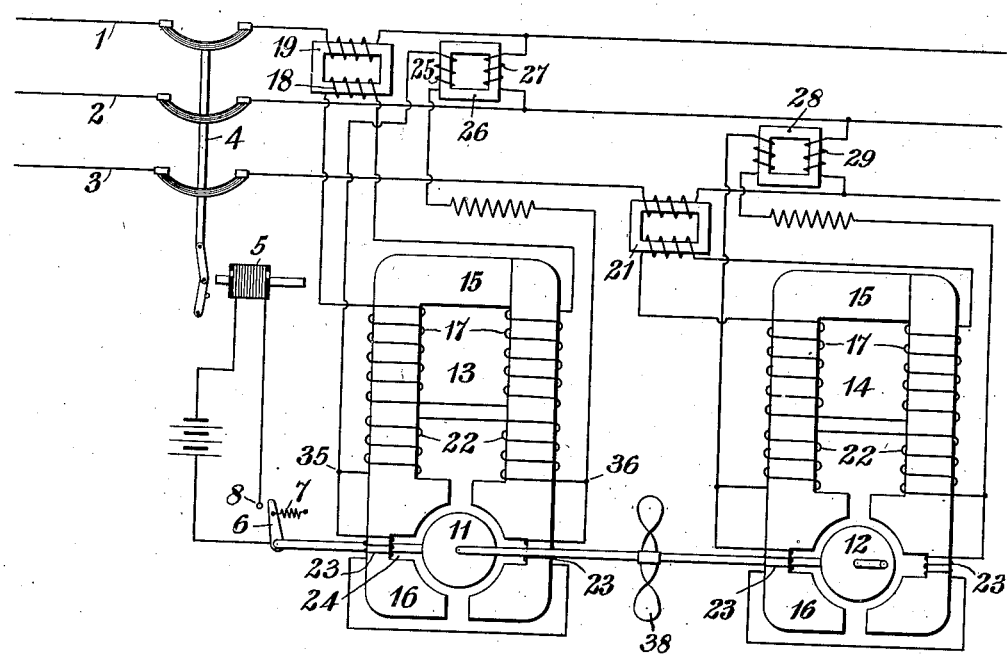

F. CONRAD.
OVERLOAD AND REVERSE CURRENT RELAY DEVICE.
APPLICATION FILED OCT. 24, 1906. RENEWED JAN. 25, 1909.

934,390.

Patented Sept. 14, 1909.

WITNESSES:
C. L. Belcher
Otto S. Schairer

INVENTOR
Frank Conrad
BY
Wesley G. Carr
ATTORNEY

F. CONRAD.
OVERLOAD AND REVERSE CURRENT RELAY DEVICE.
APPLICATION FILED OCT. 24, 1906. RENEWED JAN. 25, 1909.

934,390.

Patented Sept. 14, 1909.

2 SHEETS—SHEET 2.

WITNESSES:
C. L. Belcher
Otto S. Schairer

INVENTOR
Frank Conrad
BY
Thisley S. Carr
ATTORNEY

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

OVERLOAD AND REVERSE CURRENT RELAY DEVICE.

934,390.

Specification of Letters Patent.  Patented Sept. 14, 1909.

Original application filed May 8, 1905, Serial No. 259,388. Divided and this application filed October 24, 1906, Serial No. 340,359. Renewed January 25, 1909. Serial No. 474,153.

*To all whom it may concern:*

Be it known that I, FRANK CONRAD, a citizen of the United States, and a resident of Swissvale, in the county of Allegheny and State of Pennsylvania, have invented a new and useful Improvement in Overload and Reverse Current Relay Devices, of which the following is a specification, this application being a division of my application, Serial No. 259,388, filed May 8, 1905.

My invention relates to protective means for electric circuits, and particularly to relay devices that control the operation of circuit-protective apparatus.

The object of my invention is to provide a simple and very effective relay device whereby the operation of circuit-protective apparatus may be insured when the direction of the drop of potential in the circuit becomes reversed, or when the current traversing the circuit exceeds a predetermined amount, regardless of the voltage or power factor of the circuit.

Relay devices of the general character indicated above have usually embodied means for producing a force or torque approximately proportional to the product of the current, voltage and power factor of the circuit it was intended to protect. Such devices have operated imperfectly, because when an undue amount of current traverses a circuit, the voltage and power factor of the circuit may drop considerably and consequently sufficient torque may not be exerted to operate the instrument and trip the circuit-breakers when it is most necessary that the circuit-breakers be opened. Means have sometimes been embodied in such devices for increasing the torque in proportion to decrease in voltage, but the devices have usually been very complex in structure, and, so far as I am aware, no relay device has heretofore been constructed that was operative regardless of changes both in voltage and in power factor.

The present invention comprises not only means for producing a torque that is dependent upon the product of the current voltage and power factor of a circuit, but it comprises also a torque-producing means that is responsive to the amount of current traversing the circuit, the two torques being normally opposed. If the current traversing the circuit exceeds a predetermined amount, the torque that is dependent upon the current alone may exceed that which is dependent upon the product of current, voltage and power factor (which, as before explained, may be small on account of the decrease in voltage and power factor) by such an amount as to effect operation of the device and cause the circuit-breaker to open. If, for any reason, the current reverses its direction; that is, if the direction of the drop of potential in the circuit becomes reversed, the two torques act in the same direction, and if the total torque exceeds a predetermined amount, the device will operate and cause the circuit-breaker to open.

Figure 2:
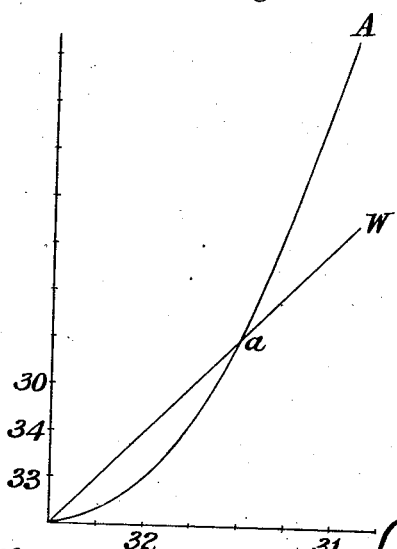
Figure 3:
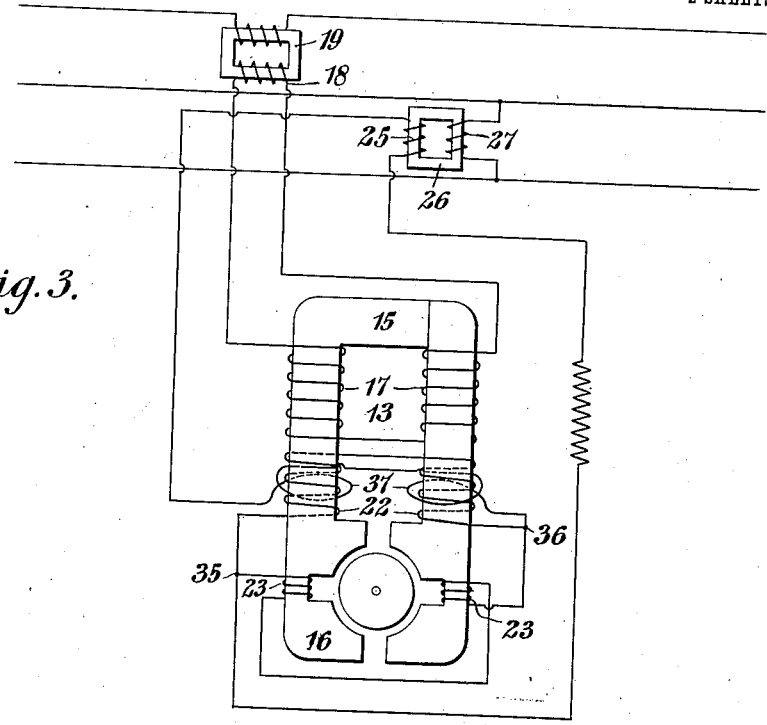
Figure 4:
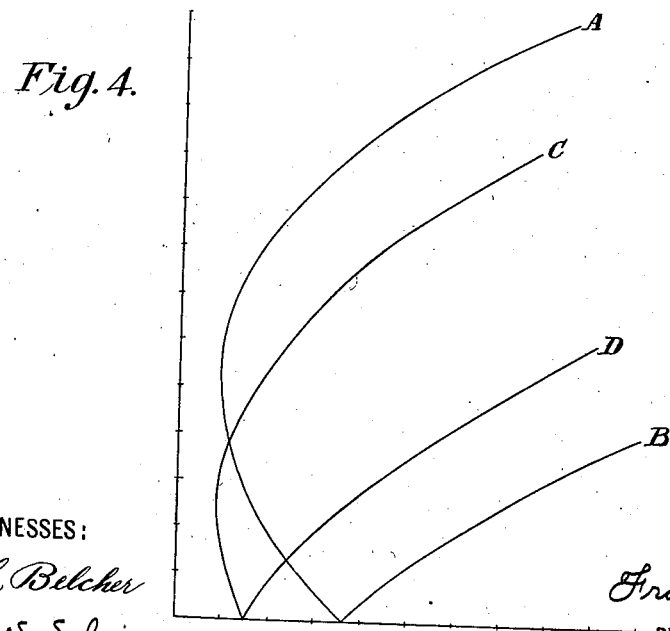

Figure 1 of the accompanying drawings illustrates, diagrammatically, a system embodying my invention. Fig. 2 is a diagram of torque curves pertaining to my invention. Fig. 3 illustrates, diagrammatically, a modified form of the relay device of Fig. 1, and Fig. 4 is another diagram of curves that pertain to my invention.

A supply circuit, comprising conductors 1, 2 and 3, is protected by means of a circuit-breaker 4 that is provided with a tripping coil 5, the circuit of which is opened and closed by means of a switch-arm 6 that is normally maintained in open-circuit position by means of a spring 7 and is adapted to be moved into engagement with a contact terminal 8 by means of a shaft 10.

On the shaft 10 are mounted movable members 11 and 12 of relay devices 13 and 14 that are modifications of the instrument forming the subject-matter of Patent No. 794,395, granted to Westinghouse Electric & Manufacturing Company, upon an application filed by me. Each of these devices comprises a U-shaped magnetizable core 15 having pole pieces 16 that embrace the movable members, and a winding 17 that is located upon the yoke of the core, the winding 17 for the device 15 being supplied, from secondary winding 18 of a transformer 19, with current proportional in amount to that which traverses supply conductor 1, and the winding 17 for the device 14 being in like manner supplied with current proportional in amount to that which traverses the conductor 3, by means of a transformer 21. Windings 22 that are also located upon the yokes of the cores 15 are connected in closed circuit with windings 23 which surround reduced portions of the pole pieces formed by recesses 24 cut in the pole faces. As described in the above mentioned patent, these instruments will operate as ammeters, so that torques will be exerted upon the movable members 11 and 12 that will be proportional, respectively, to the squares of the currents traversing conductors 1 and 3. Current is also supplied to the winding 23 of the device 13 that is proportional in amount to the difference of potential existing between the supply conductors 1 and 2, this current being derived from secondary winding 25 of a transformer 26, primary winding 27 of which is connected between the said conductors, and winding 23 of the device 14 is in like manner supplied with current proportional in amount to the difference of potential existing between the supply conductors 2 and 3 by means of a transformer 28, primary winding 29 of which is connected between the said conductors. According to well understood principles, the torques exerted upon the movable members 11 and 12 will then be proportional, respectively, to the currents traversing the windings 17, the voltages impressed on the windings 23, and the cosines of the phase angles existing between the currents and the electromotive forces. The torques of the instruments, when operating as ammeters, should normally oppose their torques when operating as wattmeters.

The operation of the system may be understood from a consideration of the curves of Fig. 2, in which the abscissæ are proportional to the amounts of current traversing a circuit and the ordinates are proportional to the torques exerted upon the conducting disks. A curve A represents the variations in the torque due to variations in the amount of current, and it has approximately the form of a parabola, since the torque varies approximately in proportion to the square of the current. Curve W is that of the wattmeter element and, for 100 per cent. power factor, it is approximately a straight line, since the torque of the wattmeter device is approximately proportional to the first power of the current. The two curves cross at a point $a$, under which conditions the two torques are exactly balanced.

Let it be assumed that to move the switch-arm 6 against the force exerted by the springs 7, a torque is required which is equal to that represented by the length of the ordinate 0—30. When the current traversing the circuit either equals or exceeds that represented by the length of the abscissæ 0—31, the torque exerted by the ammeter element will exceed that exerted by the wattmeter element by an amount either equal to or in excess of that represented by the length of the ordinate 0–30, and the switch-arm 6 will then be moved into engagement with the contact terminal 8, thereby completing the circuit of the operating magnet winding 5 and causing the circuit-breaker 4 to open. If a current equal to that represented by the length of the abscissa 0–32 traverses the circuit in a direction opposite to the normal direction, the torque exerted by the ammeter element will be represented by the length of ordinate 0–33 and the torque exerted by the wattmeter element will be represented by the length of the ordinate 0–34. These two torques will act in the same direction so that the total torque will be represented by the sum of the ordinates 0–33 and 0–34 and will be equal to the torque represented by the ordinate 0–30. If the sum of the torques is equal to or exceeds the length of ordinate 0–30, the switch-arm 6 will be moved into engagement with the contact terminal 8, the operating magnet winding 5 will be energized and the circuit-breaker 4 will be caused to open. It will be noted that the switch-arm 6 moves into engagement with the contact terminal 8 whether operated on account of an excessive current in the supply circuit or on account of a reversal of the direction of the drop of potential, because the direction of the torque of the wattmeter mechanism changes when the direction of the drop of potential in the circuit reverses. It is evident that the current derived from the secondary winding 25 of transformer 26 divides at the points 35 and 36, part of it traversing the winding 23 and part the winding 22, the part which traverses the winding 23 producing a flux which coöperates, as just described, with that produced by the current traversing the winding 17 to exert a torque upon the movable member 11 that is proportional to the amount of energy traversing the circuit. A torque is also exerted upon the movable member 11 which is produced by the fluxes due to the currents in the windings 22 and 23 respectively that are derived from the secondary winding 25 of the transformer 26. However, as the current supplied to the winding 23, from the transformer 26, is opposite in direction to the current supplied to the same winding from the winding 22, acting as a secondary to the winding 17, it does not supplement the main ammeter torque but is opposed to it. Then the amount of current which may traverse the circuit when the direction of the drop of potential is normal without causing the circuit-breakers to open is in excess of that which could traverse the circuit if such a torque were not exerted. When the direction of the drop of potential becomes reversed, the three torques are added, because the two elements of current in the winding 23 then become of the same direction, and consequently less current may traverse the circuit under these conditions than if this third torque were not exerted. As it is ordinarily desirable that the amount of current which may traverse the circuit when the direction of the drop of potential is normal without causing the breakers to open should be large as compared with the normal current, and that the circuit-breakers should be opened by only a very small amount of current when the direction of the potential drop is reversed, it is seen that this form of instrument will generally be found most useful as a protective device. In certain cases, however, it may be found desirable to vary these conditions of operation, and to that end I have provided the yoke of the core of the instrument shown in Fig. 3 with an additional winding 37 that is connected in series circuit with the secondary winding 25 of the transformer 26. The object of this winding is to neutralize the flux produced by that current in the winding 22 which is derived from the secondary winding 25 of the transformer 26.

For the purpose of illustrating the effect of the winding 37 upon the operation of the instrument, I have shown curves in Fig. 4, the ordinates of which are proportional to the amount of current traversing a circuit and the abscissæ of which are proportional to the resultant torque of the instrument; that is, to the algebraic sum of the torques exerted by the instrument when operating respectively as a wattmeter and as an ammeter. The curve A illustrates the variations in the resultant torque with the amount of current traversing a circuit when the direction of the drop of potential is normal and when an instrument of the form shown in Fig. 1 is employed. Curve B illustrates the variations in the resultant torque with the variations in the amount of current traversing a circuit when the direction of the drop of potential is reversed from its normal direction and when an instrument of the form shown in Fig. 1 is employed. Curve C illustrates the variations in the resultant torque with variations in the amount of current traversing a circuit when the direction of the drop of potential is normal and when an instrument of the form shown in Fig. 3 is employed, and curve D illustrates the variations in the resultant torque with variations in the amount of current traversing a circuit when the direction of the drop of potential is reversed from its normal direction when an instrument of the form shown in Fig. 3 is employed.

A comparison of curve A with curve C demonstrates that if a neutralizing winding 37 is not employed, the amount of current which may traverse a circuit when the direction of the drop of potential is normal without causing the relay device to trip the circuit-breakers is considerably greater in amount than the current at which the circuit-breakers would be opened if the neutralizing winding 37 were employed.

A comparison of curves B and D demonstrates the fact that the amount of current which may traverse a circuit, when the direction of drop of potential is reversed from its normal direction, without causing the circuit-breakers to open is less when the compensating winding 37 is omitted than when it is employed. The reason for this is that the torque which it is sought to eliminate by means of the compensating winding 37 opposes the main torque produced by the instrument operating as an ammeter when the direction of the drop of potential is normal, while the three elements of torque produced by the instrument are added when the direction of the drop of potential is reversed from its normal direction. If the winding 37 is employed, this torque may be eliminated, but the current which may traverse the circuit when the direction of the drop of potential is normal will be less, and the current which may traverse the circuit when the direction of the drop of potential is reversed from its normal direction will be greater, than if no compensating winding were employed.

In the practical use of my invention, it may become desirable to provide means for retarding or damping the movements of the rotatable member in order to prevent operation of an instrument in a parallel circuit to one which may have become disabled and which is protected by another instrument, and also in order to prevent sudden overloads or other momentary disturbances in the circuit from causing the circuit-breakers to open. I have accordingly provided the shaft 10, which connects the rotatable conducting members with a damping device comprising radial vanes 38, it, of course, being understood that any other suitable form of damping device may be employed.

While the forms of devices here shown are satisfactorily operative and may be found preferable to other constructions that may be devised, it is to be understood that I do not limit myself to these specific forms.

I claim as my invention:

1. The combination with a supply circuit, a movable conducting member, and a magnetizable core having a yoke and polar faces adjacent to the conducting member, of a magnetizing winding located on the yoke of the core, a second winding located on the yoke of the core and a winding located on the polar extremities of the core and connected in closed circuit with said second winding, said polar extremity winding being supplied with a voltage that is proportional to that of the supply circuit.

2. The combination with a supply circuit, a movable conducting member and a magnetizable core comprising a yoke and pole pieces having reduced portions adjacent to the conducting member, of a magnetizing winding located on the yoke of the core to which is supplied a current that is proportional in amount to the current in the supply circuit, a second winding located on the yoke of the core, and a winding connected in closed circuit therewith and surrounding the reduced portions of the pole pieces upon which is impressed a voltage that is proportional to that of the supply circuit.

3. The combination with a movable conducting member and a magnetizable core comprising a yoke and pole pieces adjacent to the conducting member, of a magnetizing winding located on the yoke of the core, a second winding located on the yoke of the core, a winding connected in closed circuit with said second winding and located on the pole pieces, and a third winding located on the yoke of the core in proximity to the second winding.

4. The combination with a supply circuit, a movable conducting member and a magnetizable core comprising a yoke and pole pieces adjacent to the conducting member, of a magnetizing winding located on the yoke of the core and supplied with current proportional in amount to that traversing the supply circuit, a second winding located on the yoke of the core, a winding located on the pole pieces and connected in closed circuit with said second winding, said pole piece winding being supplied with a voltage that is proportional to that of the supply circuit, and a third winding located upon the yoke of the core in proximity to the second winding and supplied with current proportional in amount and opposed to that portion of the current traversing the second winding that is derived directly from the supply circuit.

5. The combination with a supply circuit, a movable conducting member and a magnetizable core comprising a yoke and pole pieces having reduced portions adjacent to the conducting member, of a magnetizing winding located on the yoke of the core and supplied with current proportional in amount to that traversing the supply circuit, a second winding located on the yoke of the core, a winding surrounding the reduced portions of the pole pieces and connected in closed circuit with said second winding upon which is impressed a voltage that is proportional to the voltage of the supply circuit, and a third winding located upon the yoke of the core in proximity to the second winding and connected in series with the circuit which supplies to the pole piece winding a voltage proportional to that of the supply circuit.

6. The combination with a supply circuit, a movable conducting member, means for retarding the operation of the movable member, and a magnetizable core having a yoke and polar faces adjacent to the conducting member, of a magnetizing winding located on the yoke of the core, a second winding located on the yoke of the core and a winding located on the polar extremities of the core and connected in closed circuit with said second winding to which a voltage is supplied that is proportional to the voltage of the supply circuit.

7. The combination with a supply circuit, a movable conducting member, means for retarding the operation of the movable member, and a magnetizable core comprising a yoke and pole pieces adjacent to the conducting member, of a magnetizing winding located on the yoke of the core, a second winding located on the yoke of the core, a winding located on the pole pieces and connected in closed circuit with said second winding, and a third winding located on the yoke of the core in proximity to the second winding.

8. The combination with a supply circuit, a movable member, and a magnetizable core having pole pieces adjacent to the movable member, of a core winding supplied with current that is proportional in amount to the current in the supply circuit, an auxiliary core winding, a winding located upon the pole pieces and connected in closed circuit with the auxiliary core winding and receiving a voltage that is proportional to the voltage of the supply circuit.

9. The combination with a supply circuit, a movable member, and a magnetizable core having pole pieces adjacent to the movable member, of a core winding supplied with current that is proportional in amount to the current in the supply circuit, an auxiliary core winding, a winding located upon the pole pieces and connected in closed circuit with the auxiliary core winding and receiving a voltage that is proportional to the voltage of the supply circuit, and a third core winding located in proximity to the auxiliary core winding.

In testimony whereof, I have hereunto subscribed my name this 18th day of October, 1906.

FRANK CONRAD.

Witnesses:
OTTO S. SCHAIRER,
BIRNEY HINES